May 5, 1942.  R. F. BRADY  2,281,665
PHONOGRAPHIC APPARATUS
Filed Sept. 30, 1939   2 Sheets-Sheet 1
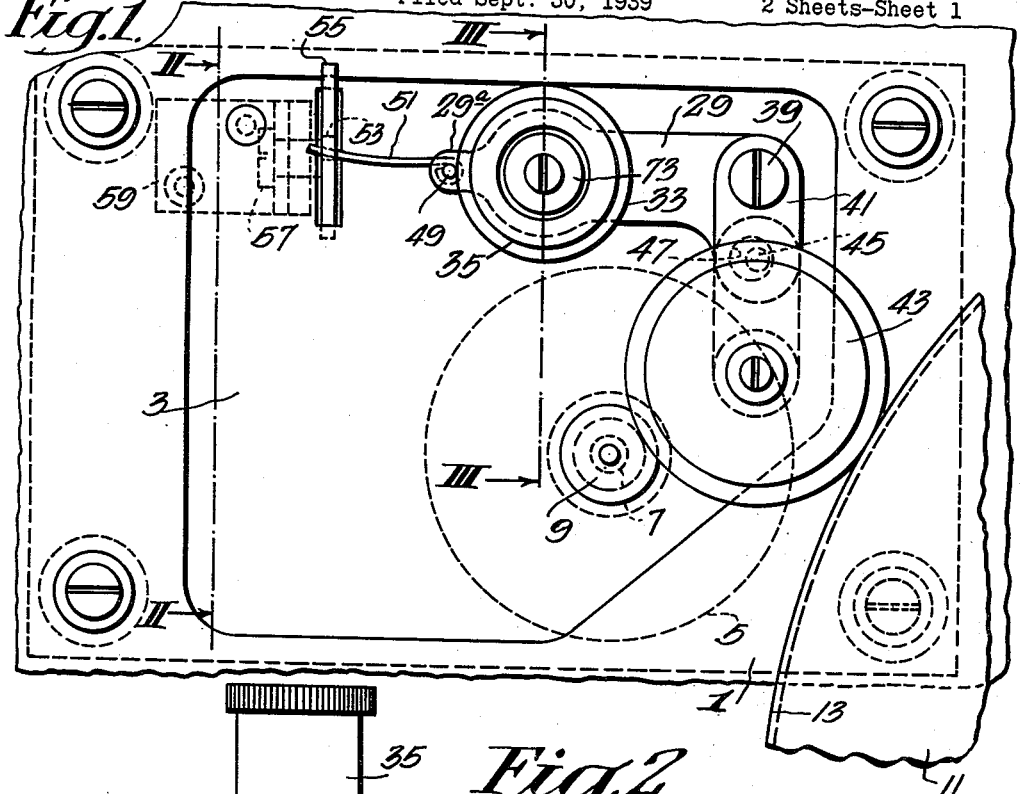
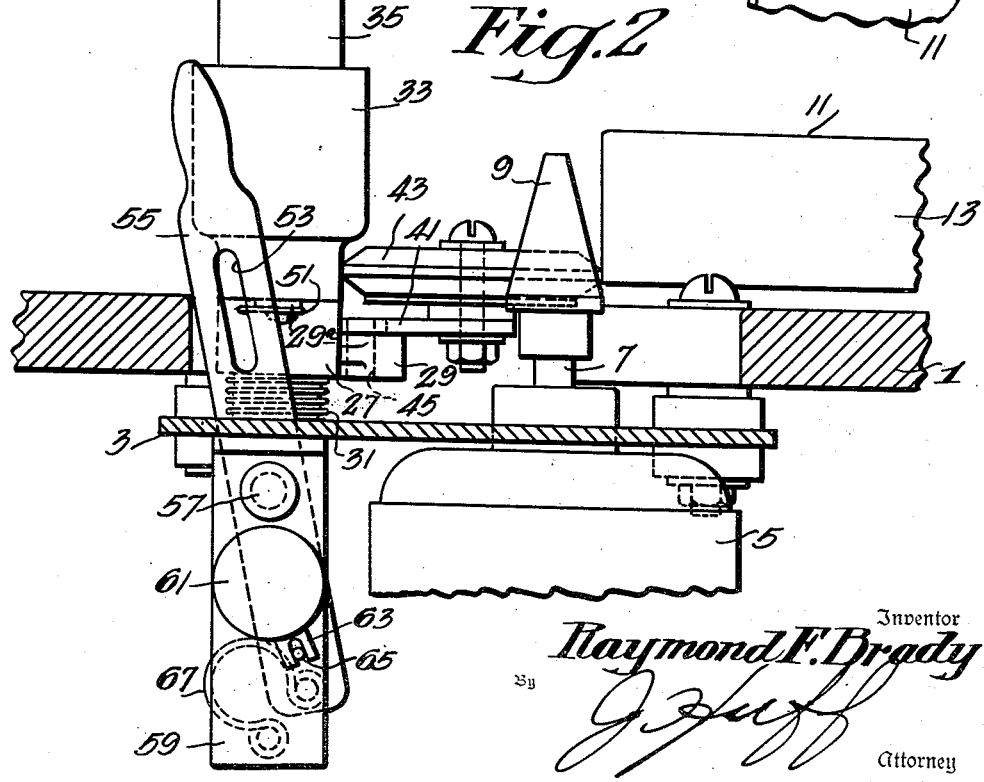
Inventor
Raymond F. Brady
Attorney May 5, 1942.  R. F. BRADY  2,281,665
PHONOGRAPHIC APPARATUS
Filed Sept. 30, 1939  2 Sheets-Sheet 2
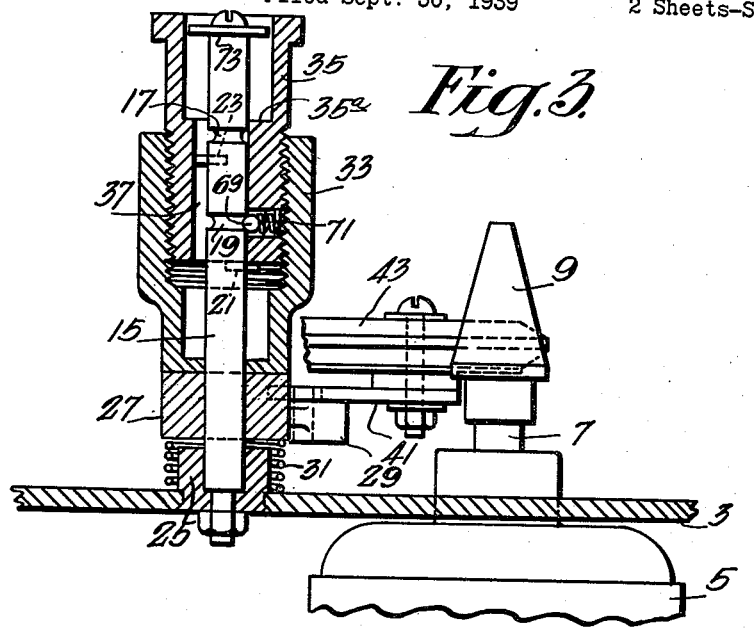
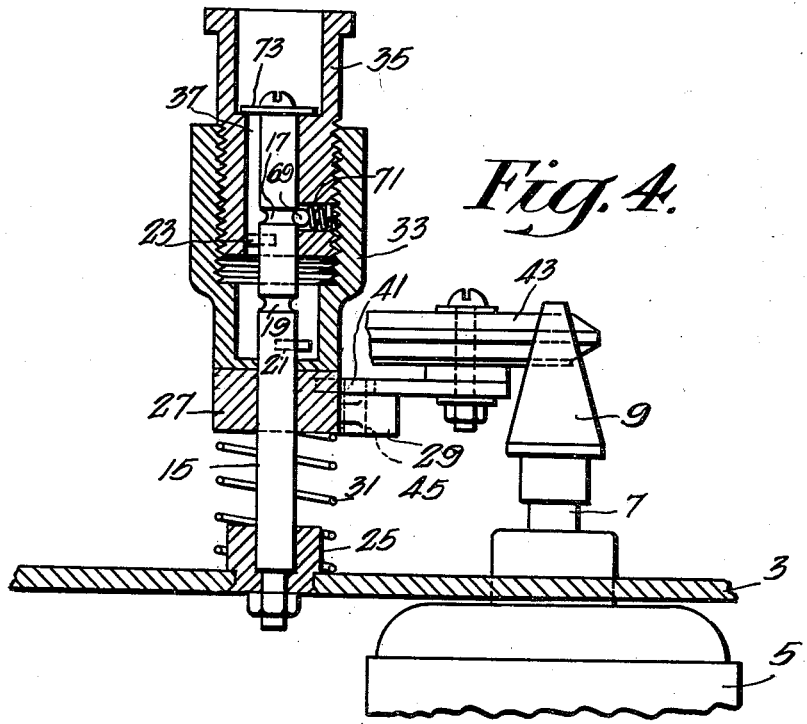
Inventor
Raymond F. Brady
By
Attorney Patented May 5, 1942

2,281,665

UNITED STATES PATENT OFFICE 2,281,665

PHONOGRAPHIC APPARATUS

Raymond F. Brady, Haddonfield, N. J., assignor to Radio Corporation of America, a corporation of Delaware Application September 30, 1939, Serial No. 297,201

7 Claims. (Cl. 74—193)

This invention relates to phonographic apparatus and more particularly to a multi-speed turntable driving mechanism therefor, the present invention being an improvement over that disclosed in the copending application of Raymond F. Brady and Paul Weathers, Serial No. 260,282, filed March 7, 1939.

In the said copending application, there is disclosed a two speed turntable driving mechanism by means of which the turntable may be driven at any one or the other of two speeds at will. While this is generally satisfactory, there are some cases in which it may be desired to drive the turntable at an intermediate speed or at some other speed not provided for by the mechanism of the aforesaid application. Furthermore, while the mechanism disclosed in the aforesaid application is designed to drive the turntable at one or the other of two predetermined speeds, it has been found in practice that slight departures from these speeds are often encountered as a result of variations in line voltage supplied to the electric driving motor, variations in load upon the turntable, etc.

The primary object of my present invention is to provide an improved turntable driving mechanism which will be free from the above noted objections.

More particularly, it is an object of my present invention to provide an improved phonograph turntable driving mechanism which will afford a wide range of speed adjustment.

It is also an object of my present invention to provide an improved phonograph turntable driving mechanism as aforesaid by means of which fine adjustments of turntable speed may be obtained to compensate for slight departures from the intended speed caused by such factors as those noted above.

Another object of my present invention is to provide an improved phonograph turntable driving mechanism which is simple in construction, low in cost, and highly efficient in operation.

In accordance with my present invention, I provide a turntable having a wide peripheral flange or rim and a driving motor in spaced relation thereto which has a tapered pulley on its driving shaft. An idler pulley constituting a friction wheel is interposed between the tapered driving pulley and the turntable rim and constitutes a driving coupling therebetween for delivering torque from the motor to the turntable. By shifting the position of the idler friction wheel along the tapered motor pulley, the speed of the turntable may be varied at will, two independent adjusting means being provided for adjusting the idler pulley along the tapered driving pulley, one for relatively coarse adjustment thereof to provide an approximate speed adjustment for the turntable, and the other a relatively fine, or vernier, adjustment to provide a more exact speed adjustment for the turntable.

The novel features that I consider characteristic of my invention are set forth with particularity in the appended claims. The invention itself, however, both as to its organization and method of operation, together with additonal objects and advantages thereof, will best be understood from the following description of one embodiment thereof, when read in connection with the accompanying drawings, in which—

Figure 1 is a plan view of my improved driving mechanism with the coupling idler in driving position, Figure 2 is a sectional view taken along the line II—II of Fig. 1 and showing the coupling idler in position to drive the turntable at a relatively high speed, Figure 3 is a sectional view taken along the line III—III of Fig. 1 and also showing the idler pulley in position to drive the turntable at a relatively high speed, and Figure 4 is a view similar to Fig. 3 but showing the idler pulley in position to drive the turntable at a relatively low speed.

Referring more particularly to the drawings, wherein similar reference characters designate corresponding parts throughout, there is shown a motorboard 1 to which is secured a motorplate 3 carrying a motor 5. The motor 5 has a driving shaft 7 which extends through the motor plate 3 and which is provided at its upper end with a tapered driving pulley 9 which may be of conical form or which may have any other suitable form of gradually varying diameter. Above the motorboard 1 is suitably mounted a turntable 11 having a relatively wide peripheral flange or rim 13, the turntable 11 being mounted for rotation in conventional manner.

Fixed to the motorplate 3 is a post 15 which is formed with a pair of spaced grooves 17 and 19 and which is provided with a pair of spaced radially extending keys 21 and 23 for purposes to be presently set forth, a sleeve 25 being also fixed to the motorplate 3 and surrounding the post 15 at the bottom thereof. The post 15 slidably and rotatably receives a collar 27 from which extends a supporting arm 29, and a coil spring 31 surrounds the sleeve 25, the spring 31 being interposed between the motorplate 3 and the bottom of the collar 27 to constantly urge the latter in an upward direction along the post 15. Also slidably and rotatably received on the post 15 is a hollow, cylindrical member 33 which is internally threaded and which, in turn, threadedly receives a second member 35. The member 35 is formed with a central bore into which the upper portion of the post 15 extends and which communicates with a radial key-way 37 which receives the key 23. Thus, although the member 35 is free to move longitudinally along the post 15, it cannot turn thereon by reason of the fact that the key 23 extends into the key-way 37.

Pivotally mounted on the arm 29 through a pin 39 is a lever 41 on the free end of which is rotatably mounted a rubber-tired idler or friction wheel 43 which has a narrow periphery and is adapted to be interposed between the conical driving pulley 9 and the rim 13 of the turntable to provide a driving coupling therebetween. The lever 41 is loosely mounted on the pin 39 so that the friction idler 43 is free to float on the arm or supporting member 29, a pin 45 on the lever 41 being received within an opening 47 in the arm 29 to limit the floating movement of the idler 43 with respect to the arm 29. This floating mounting is desirable in order to permit the coupling idler 43 to be wedged in slightly between and to accommodate itself snugly to the conical driving pulley 29 and the turntable rim 13 when the idler is brought into engagement therewith by means now about to be described.

The collar 27 is provided with an extension 29a having a pin 49 thereon to which one end of a spring 51 is fixed. The opposite end of the spring 51 is received in a slot 53 of a control lever 55 which is pivotally mounted on a pin 57 received in a bracket 59 fixed to the under surface of the motorplate 3. A switch 61, preferably of the toggle type, is in circuit with the electric motor 5 and is also carried by the bracket 59, the switch 61 being provided with a forked operating lever 63 which receives a pin 65 on the control lever 55. An over-center spring 67 having one end fixed to the bracket 59 and its other end fixed to the control lever 55 is arranged to hold the control lever 55 in either one or the other of two positions presently to be described.

As described heretofore, torque may be transmitted from the conical driving pulley 9 to the turntable 11 by engaging the friction idler 43 therewith. This is accomplished by manipulating the control lever 55 into the position shown in Figs. 1 and 2, the slot 53 acting on the spring 51 to turn the arm 29 and the parts carried thereby in a clockwise direction (as viewed in Fig. 1). The floating mounting of the idler 43 on the arm 29 permits the idler 43 to readily accommodate itself to both the conical drive pulley 9 and the rim 13 of the turntable, and the pressure of the edge of the slot 53 on the spring 51 is effective to firmly press the idler 43 against both the cone 9 and the turntable rim 13. When it is desired to disengage the friction idler 43 from the cone 9 and the turntable rim 13, it is merely necessary to move the control lever 55 in a clockwise direction to its extreme right-hand position (as seen in Fig. 2) whereupon the spring 51, the arm 29, and the parts carried by the latter will be moved in a counter-clockwise direction (as viewed in Fig. 1) to break the coupling between the cone 9 and the turntable 13.

To effect a change of speed for the turntable, resort is had to the cylindrical members 33 and 35. When it is desired to drive the turntable at a relatively high speed (for example, at 78 R. P. M.) the member 33 may be grasped by the hand and pushed down along the post 15 against the action of the spring 31 until a spring pressed ball 69 in a radial bore 71 in the member 35 engages the groove 19 to releasably lock the assembly 33—35 in the position shown in Fig. 3. Thereafter, the control lever 55 is moved to the position shown in Fig. 2, whereupon the friction idler 43 is brought into engagement with the driving cone 9 and the turntable arm 13, as clearly shown in Fig. 1. On the other hand, when it is desired to drive the turntable 11 at a relatively low speed (for example, 33⅓ R. P. M.), the cylindrical member 33 and the parts carried thereby are moved upwardly along the post 15, assisted by the spring 31, until the spring pressed ball 69 engages the groove 17 in the post 15, thereby releasably locking the assembly 33—35 in its upper position, after which the control lever 55 may be manipulated to bring the friction idler 43 into engagement with the driving cone 9 and the rim 13 of the turntable. The key 21, in cooperation with the lower end of the member 35 limits the downward movement of the assembly 33—35 and a stop washer 73 fixed to the upper end of the post 15 serves to limit the upward movement of the assembly 33—35 by engagement with a shoulder 35a formed on the member 35. To effect any other speed for the turntable, the post 15 may be provided with additional grooves similar to the grooves 17 and 19.

Under certain circumstances, it may be found that the positions of the assembly 33—35 determined by the grooves 17 and 19 and the spring pressed ball 69, previously described, may not be quite correct to provide the desired speed. The speed adjustments previously described provide a relatively coarse and approximate speed adjustment for the turntable. It is to afford a fine and more exact speed adjustment that I provide a threaded coupling between the members 33 and 35. Thus, after the initial adjustment of the coupling idler 43 in the manner above described has been made, the member 33 may be rotated on the member 35 to provide a vernier adjustment of the supporting arm 29 and the parts carried thereby along the post 15 until the exact speed desired has been attained. The member 35 will, of course, be prevented from rotation by reason of the engagement of the key 23 with the key-way 37.

When the control lever 55 is thereafter thrown to the position shown in Fig. 2, the coupling idler 43 will be brought into engagement with the driving cone 9 and the turntable rim 13, as previously described, and at the same time, its pin 65, acting on the fork 63 of the switch 61, will throw the switch 61 to the "on" position to complete the circuit to the motor 5. When it is desired not to use the apparatus further, the control lever 55 is moved in a clockwise direction (as seen in Fig. 2) and this not only disengages the friction idler 43 from the driving cone 9 and the turntable rim 13 (thereby preventing flat spots from forming on the periphery thereof), but also throws the switch 61 to the "off" position and thereby automatically shuts off the motor 5.

From the foregoing description it will be apparent to those skilled in the art that I have provided an improved, novel, and very simple turntable driving mechanism for phonographs which will not only drive the turntable at a very uniform and accurate speed, but which will also afford a selection of any one of a number of speeds within a wide range determined by the length and taper of the driving portion 9 of the motor shaft 7. It will be evident, no doubt, to those skilled in the art that although I have shown and described but a single embodiment of my present invention, many variations thereof are possible. For example, instead of the threaded connection between the members 33 and 35, any other suitable means may be employed to effect fine relative movement therebetween. Also, instead of adjusting the friction roller 43 along the conical pulley 9, the roller 43 may be set in a fixed plane, and the conical pulley 9 made adjustable on the shaft 7. This has the advantage of providing a way of calibrating the various turntable speeds with reference to the fixed slots 17 and 19. Many other changes will undoubtedly readily suggest themselves to those skilled in the art. I, therefore, do not wish to be limited except insofar as is made necessary by the prior art and by the spirit of the appended claims.

I claim:

1. In control apparatus for power transmission mechanism having a driving member and a driven member at least one of which has a surface of varying diameter, and a friction idler adapted to be interposed between said members, the combination of supporting means, a pair of relatively movable devices associated with said idler and movably carried by said supporting means, said devices being movable bodily as a unit to provide a relatively coarse adjustment of said idler along said members to provide an approximate speed adjustment for said driven member, and one of said devices being adjustable relative to the other of said devices to provide a relatively fine adjustment of said idler along said members whereby to provide a more exact speed adjustment of said driven member.

2. In control apparatus for power transmission mechanism having a driving member and a driven member at least one of which has a surface of varying diameter, and a friction idler adapted to be interposed between said members, the combination of means providing a relatively coarse adjustment of said idler along said members to provide an approximate speed adjustment for said driven member, means for releasably locking said idler in certain predetermined positions of adjustment upon adjustment by said first-named means, and means providing a relatively fine adjustment of said idler along said members to provide a more exact speed adjustment of said driven member.

3. In control apparatus for power transmission mechanism having a driving member and a driven member at least one of which has a surface of varying diameter, and a friction idler adapted to be interposed between said members, the combination of means providing a relatively coarse adjustment of said idler along said members to provide an approximate speed adjustment for said driven member, means providing a relatively fine adjustment of said idler along said members to provide a more exact speed adjustment of said driven member, means for bringing said idler into and out of engagement with said members at will, and means for releasably locking said idler in either of said last-named positions.

4. In control apparatus for power transmission mechanism having a driving member and a driven member at least one of which has a surface of varying diameter, and a friction idler adapted to be interposed between said members, the combination of means providing a relatively coarse adjustment of said idler along said members to provide an approximate speed adjustment for said driven member, means providing a relatively fine adjustment of said idler along said members to provide a more exact speed adjustment of said driven member, means for bringing said idler into and out of engagement with said members at will, means for holding said idler firmly against preselected portions of said members when said idler is brought into engagement with said members after adjustment thereof relative to said members, and means for releasably locking said idler either in engagement with said members or out of engagement with said members.

5. The invention set forth in claim 2 characterized in that said adjustment means comprises a pair of relatively movable devices movable bodily as a unit to provide said coarse adjustment, and characterized further in that one of said devices is movable relative to the other of said devices to provide said more exact adjustment.

6. In control apparatus for power transmission mechanism having a driving member and a driven member at least one of which has a surface of varying diameter, and a friction idler adapted to be interposed between said members, the combination of a supporting post, a pair of relatively movable devices slidably carried on said post, and a supporting arm on one of said devices carrying said idler, said devices being movable bodily as a unit to provide a relatively coarse adjustment of said arm and idler along said members to provide an approximate speed adjustment for said driven member, and said arm-carrying device being adjustable relative to the other of said devices to provide a relatively fine adjustment of said arm and idler along said members to provide a more exact speed adjustment of said driven member.

7. The invention set forth in claim 6 characterized by the addition of cooperative means on one of said devices and on said post for releasably locking said devices in predetermined positions on said post.

RAYMOND F. BRADY.